United States Patent [19]

Fairchild

[11] 4,299,141

[45] Nov. 10, 1981

[54] MECHANICAL TRANSMISSION HAVING REDUCED FRICTION DIRECT DRIVE

[76] Inventor: Lamar J. Fairchild, Rte. 9, Box 500, Meridian, Miss. 39301

[21] Appl. No.: 76,541

[22] Filed: Sep. 17, 1979

[51] Int. Cl.³ ............................................. F16H 57/10
[52] U.S. Cl. ................................... 74/785; 192/17 R
[58] Field of Search .................. 192/17 R, 17 A, 4 A, 192/4 R, 17 C, 99 A, 110 B, 110 R, 3.52, 3.24, 84 R, 85 V, 12 D; 74/785, 786, 787; 188/163, 356; 292/201

[56] References Cited

U.S. PATENT DOCUMENTS

| | | | |
|---|---|---|---|
| 1,947,428 | 2/1934 | Thomas | 192/13 R |
| 2,090,152 | 8/1937 | Porter | 192/85 V |
| 2,308,082 | 1/1943 | Johnson | 74/276 |
| 2,735,310 | 2/1956 | McFarland | 74/409 |
| 2,822,705 | 2/1958 | Orr et al. | 192/17 R |
| 3,589,485 | 6/1971 | Kajitani | 192/18 B |
| 3,664,471 | 5/1972 | Seidlitz | 192/4 R |
| 3,702,127 | 11/1972 | Yokoyama | 192/18 B |
| 4,071,271 | 1/1978 | Bourrie | 292/201 |
| 4,185,520 | 1/1980 | Henneman et al. | 74/785 |

FOREIGN PATENT DOCUMENTS

| | | | |
|---|---|---|---|
| 507773 | 7/1947 | Canada | 74/785 |
| 622932 | 10/1944 | United Kingdom | 192/18 B |

*Primary Examiner*—George H. Krizmanich
*Attorney, Agent, or Firm*—William D. Stokes

[57] ABSTRACT

A mechanical transmission having reduced friction direct drive. An input shaft from a flywheel is drivingly connected to a clutch cover and a tubular shaft. The tubular shaft is connected to a sun gear which engages a pair of planetary gears. The planetary gears are connected to an output drive shaft mounted within and coaxial with the flywheel driven tubular shaft by means of a pair of support arms. The other end of the output shaft is connected to a clutch plate mounted adjacent to the flywheel within the clutch housing. A ring gear, mounted within a gear cover, engages the planetary gears. The gear housing is mounted for rotation around both the tubular and output drive shafts. A band brake surrounds the outside of the gear housing. In reduced ratio drive the clutch is disengaged from the flywheel and the band is clamped to the gear housing so that the ring gear is fixed. The output shaft is driven by the planetary gears, which in turn are driven by the rotation of the sun gear connected through the tubular shaft to the flywheel, causing a reduced ratio output. In direct drive or high gear, the clutch is engaged causing rotation of the output shaft with the flywheel, and the band brake is released allowing the ring gear and gear housing to rotate freely at the same speed as the sun and planetary gears. The output drive shaft is thus directly driven by the flywheel while the gear housing and associated gears rotate freely at the output shaft speed resulting in reduced friction in the gear train.

11 Claims, 4 Drawing Figures

MECHANICAL TRANSMISSION HAVING REDUCED FRICTION DIRECT DRIVE

BACKGROUND OF THE INVENTION

The invention relates to variable ratio mechanical transmissions and more particularly, to a mechanical transmission having a reduced friction direct drive.

Variable ratio mechanical transmissions are well-known in the prior art. Such transmissions generally have an input shaft from an engine, a clutch housing, a gear train and housing, and an output shaft. A planetary gearing arrangement may be used when it is desired to have the output shaft coaxially aligned with the input shaft. It is known in the prior art to provide for differing input-to-output drive ratios by clamping the ring gear of the planetary gearing arrangement within a fixed gear housing. It is also known to fix the ring gear to the gear housing which is free to turn, with lower ratio drive resulting when the gear housing is clamped, as is shown in U.S. Pat. No. 3,664,471. It will be recognized that for most efficient transfer of power the output shaft should be directly coupled to the input shaft and the gear train should be disengaged to reduce friction. In addition, for driving some devices such as automobiles, a neutral phase is needed wherein the output shaft is disengaged from the input shaft. However, prior art coaxially aligned transmissions have failed to provide a reduced ratio drive, a neutral phase, and a reduced friction direct drive off the input shaft, while maintaining mechanical simplicity and reliability.

SUMMARY OF THE INVENTION

These and other disadvantages of prior art devices are overcome in the present invention wherein there is provided a coaxially aligned, variable ratio mechanical transmission comprising an input shaft drivingly connected to a clutch cover having a tubular shaft or sleeve extending rearwardly therefrom. An output shaft is disposed coaxial with and extending through the tubular shaft, with one end of the output shaft connected to a clutch assembly disposed within the clutch cover and the other end of the output shaft connected to a power utilization device. The clutch assembly is selectively engageable with the clutch cover for rotation therewith. A gear housing is rotationally mounted around the tubular shaft and the output shaft. A gear assembly disposed within the gear housing comprises a sun gear mounted on the tubular shaft, a plurality of planetary gears engaging the sun gear, each planetary gear supported by a carrier means connected to the output shaft, and a ring gear formed or mounted on the inside of the gear housing engaging the planetary gears. A brake means is disposed adjacent the gear housing for selective engagement therewith. Means are provided for selectively actuating both the clutch assembly and the brake means.

To produce a reduced ratio drive of the output shaft, the clutch is disengaged from the clutch cover and the brake means is engaged with the gear housing, thus preventing the ring gear from rotating. The input shaft drives the clutch cover and the tubular shaft, which in turn causes the sun gear to drive the planetary gears held within the fixed ring gear. The support arms of the planetary gears drive the output shaft at a reduced ratio output. In direct drive or high gear, the clutch assembly is engaged with the clutch cover causing rotation of the output shaft at the same speed as the input shaft. The brake means is released allowing the ring gear and gear housing to rotate freely at the same speed as the sun and planetary gears which are driven by the tubular shaft connected to the clutch cover. Thus, the input shaft, clutch cover, clutch assembly, tubular shaft, gear housing, gear assembly, and output shaft all rotate at the same speed resulting in minimal friction in the transmission. The transmission may be placed in a neutral mode by disengaging the clutch assembly and the brake means. A housing or frame may be mounted around the transmission.

The invention thus provides for a reduced ratio drive, a neutral phase, and a reduced friction direct drive all within a compact housing using readily available parts. The brake means and clutch assembly may be automatically actuated using well-known vacuum or electrically operated devices. Additional gear units may be mounted coaxial with the gear housing to provide for multiple ratio or reverse gearing arrangements.

BRIEF DESCRIPTION OF THE DRAWINGS

These and other objects, features, and advantages of the present invention will be readily apparent from the following description of the preferred embodiment taken in conjunction with the appended claims and the accompanying drawing figures wherein:

DESCRIPTION OF THE PREFERRED EMBODIMENT

Figure 1:
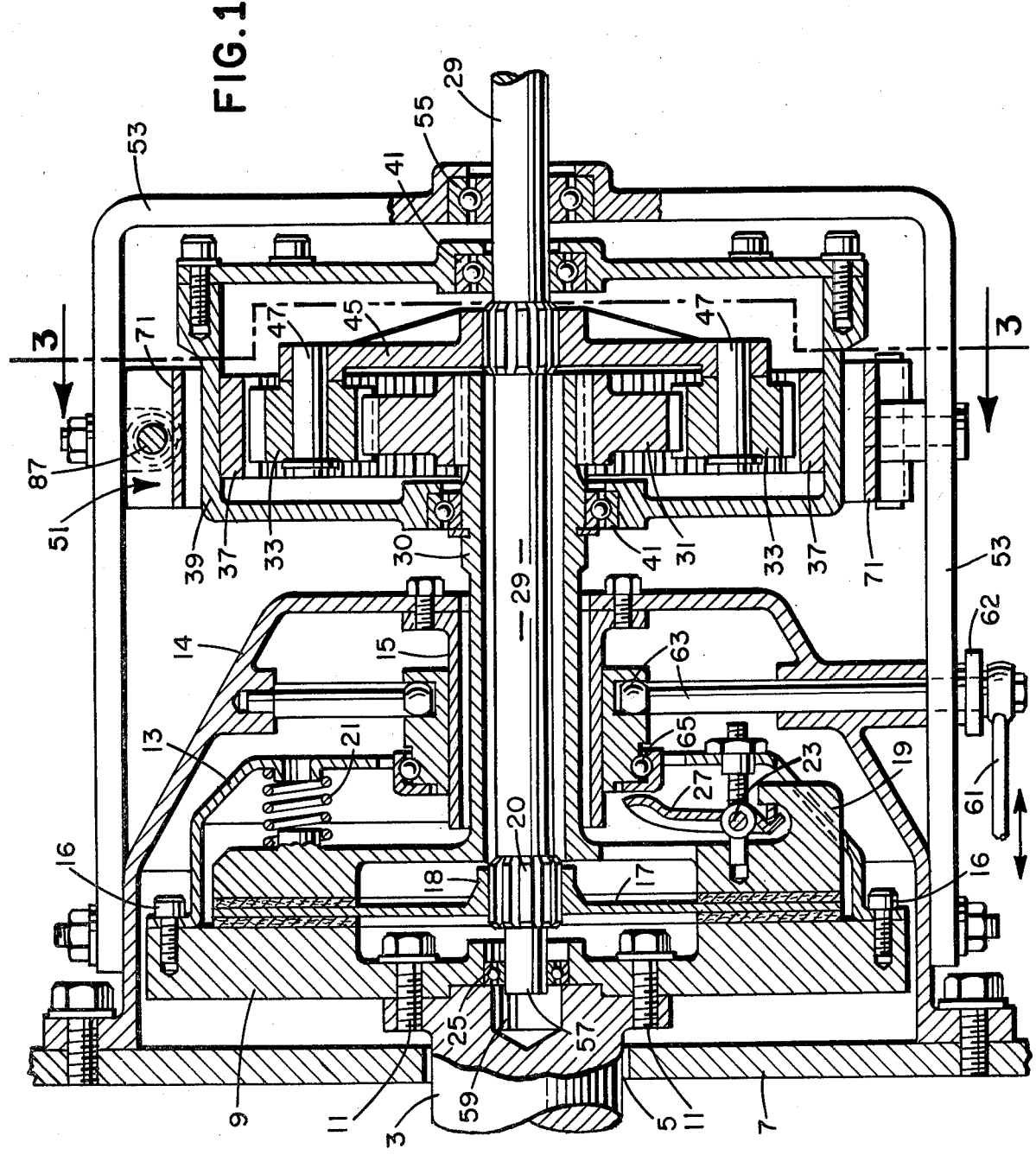
FIG. 1 is a longitudinal horizontal cross-sectional view showing the arrangement of the various components which comprise the invention.
Figure 2:
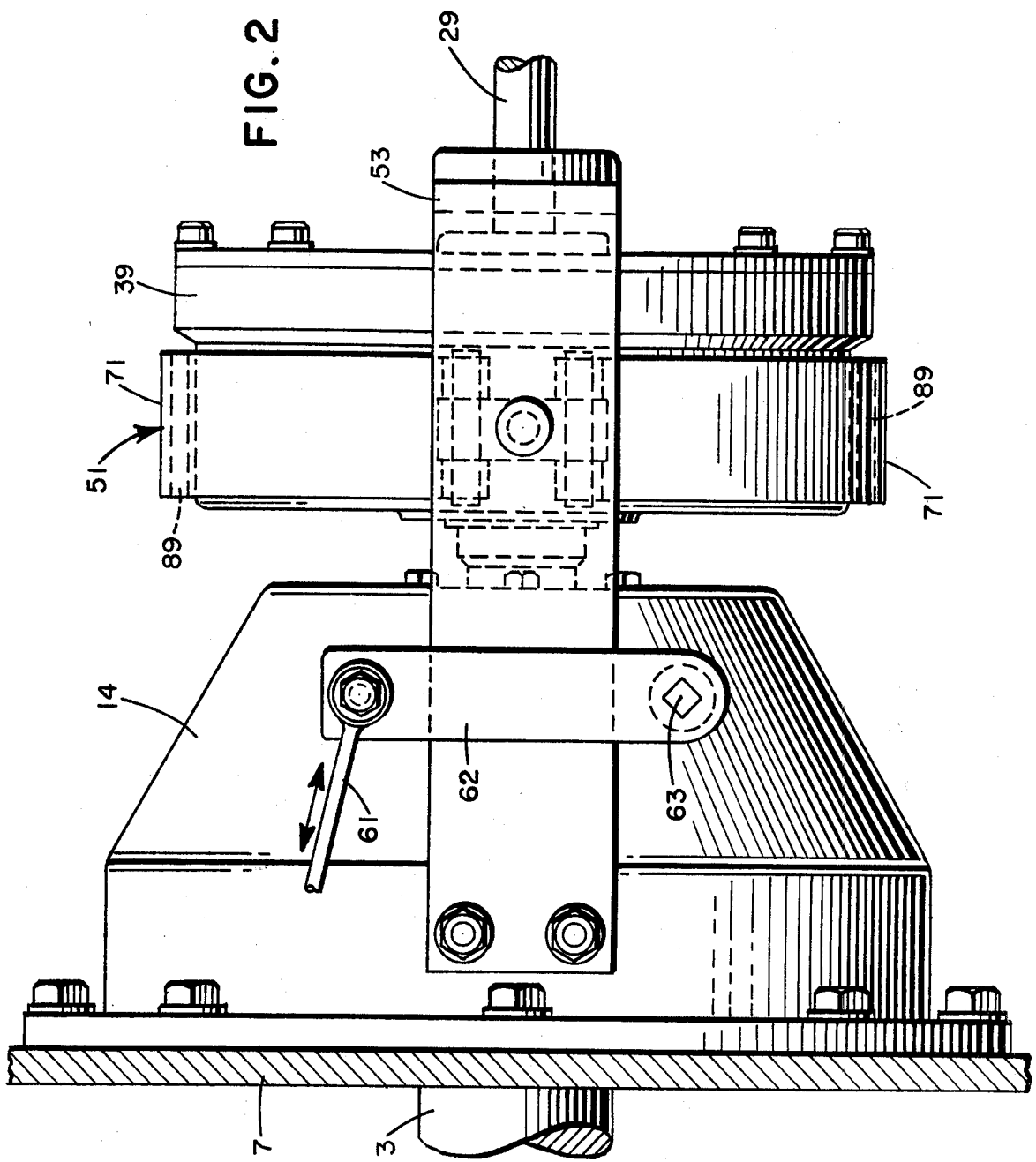
FIG. 2 is a side elevation of FIG. 1.

Referring to the drawings in which like parts bear the same numeral there is shown a crank shaft 3 on one end connected to a motor or power source (not shown) and the other end passing through an opening 5 formed within engine or motor mount 7. The crank shaft 3 is connected to a flywheel 9 by means of a plurality of bolts 11. A clutch cover 13, having a shaft opening or sleeve 15 extending rearwardly therefrom, is fastened to the flywheel 9 by means of bolts 16. A clutch assembly, comprising essentially clutch drive disc 17, pressure plate 19, pressure plate springs 21 (only one of which is shown), release finger pivot pin 23 and release levers or fingers 27 (only one of which is shown), is disposed within clutch cover 13. It should be understood that there are a number of pressure plate springs arranged circumferentially around the back of pressure plate 19; as well as several equi-spaced release levers 27. A housing 14 is provided to enclose the clutch and bearing mechanisms.

A transmission input shaft 29 is disposed coaxially inside tubular shaft 30 which is integral with pressure plate 19. One end of the shaft 29 is held in place by pilot bearing 25. Drive shaft 29 engages with clutch drive disc hub 18 on clutch drive disc 17 through splined mating projections 20. The other end of the drive shaft 29 is connected to a device for utilizing rotational power such as a wheel.

A sun gear 31 is keyed to the rear end of tubular shaft 30. Sun gear 31 in turn engages planetary gears 33. The planetary gears 33 engage internally toothed ring gear 37 which is fixedly mounted to the inside, or formed as an integral part of gear housing 39. Gear housing 39 is mounted for free rotation around tubular shaft 30 and output shaft 29 through the means of bearings and grease seals 41. (The grease seals are not shown). Planetary gears 33 are drivingly connected to output shaft 29 through support or carrier means 45 by welding or as illustrated, interlocking spline means. Carrier arms 45 support planetary gear axles 47 upon which planetary gears 33 are mounted. Carrier means 45 may comprise spider-like arms or a disk (not shown) to which axle means 47 are fastened. It will be noted that although only two planetary gears are shown in the illustrated embodiment, any number greater than two may be readily used so long as a symmetrical gear arrangement is maintained.

Figure 3:
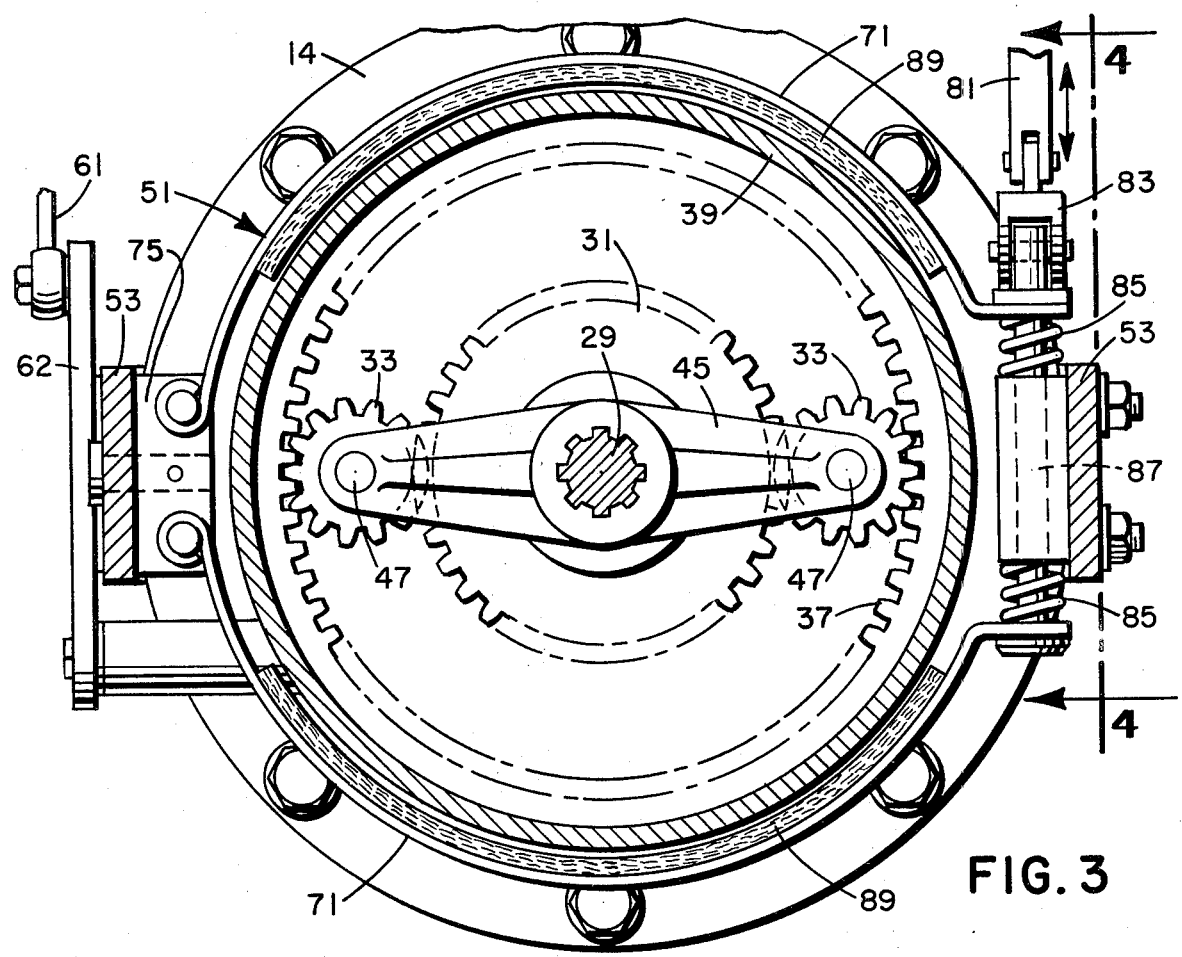
FIG. 3 is a vertical transverse section taken along line 3—3 of FIG. 1 showing the relationship of the gear, gear housing and braking means.

Referring particularly to FIGS. 1 and 3, a brake means 51 is shown mounted on frame 53. Brake means 51, which preferably comprises a band brake 71 with brake shoes 89 and actuating mechanism comprising pivotally connected arm members 81 and 83, spring members 85, and rod member 87. Brake 51 surrounds rotatable gear housing 39 and brake shoes 89 are engageable with the surface thereof. Frame 53 is depicted in FIG. 1 as a U-shaped bar mounted on the clutch housing 14 by means of bolts (not numbered) and extending rearwardly around the clutch housing 14 and gear housing 39. In the illustrated embodiment, bearing 55 is provided in frame 53 through which output shaft 29 is journaled. The other end of shaft 29 is rotatably supported by an extension 57 of shaft 29 extending through pilot bearing 25 within a depression 59 formed in crank shaft 3. If desired, frame 53 may be constructed in the form of an all encompassing housing to protect the transmission from the environment.

Clutch actuation lever 61 is connected to a lever 62 which is attached to throw-out fork 63 which reciprocates release bearing 65. The actuating means for lever 61 is not shown.

Figure 4:
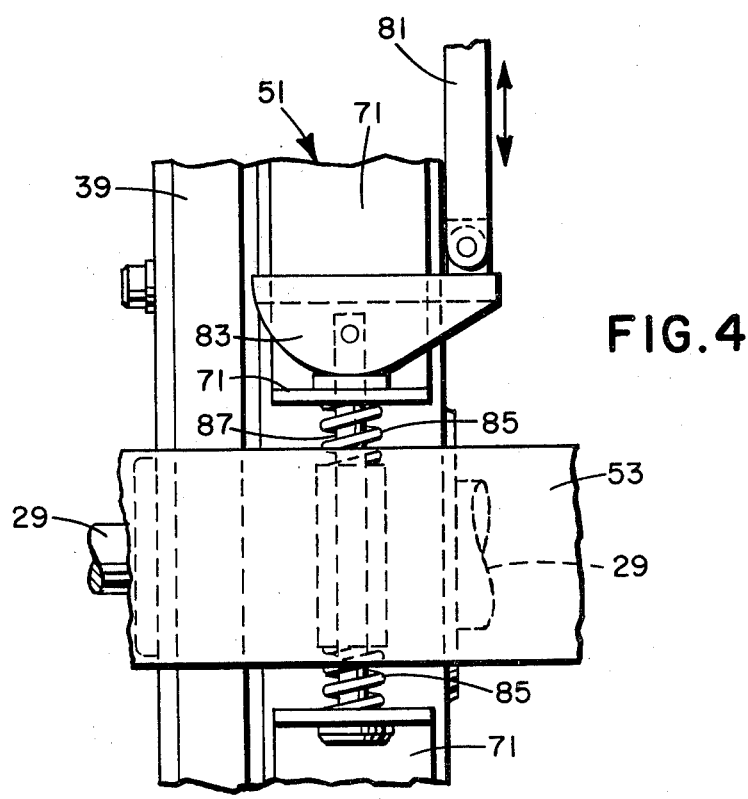
FIG. 4 is an elevational view taken along lines 4—4 of FIG. 3 showing the brake actuator mechanism.

As particularly depicted in FIGS. 3 and 4, brake means 51 comprise band members 71, pivoted arm members 81 and 83, spring members 85, a rod member 87 and brake shoes 89, fixedly attached to frame 53 by an anchor plate 75. The opposite ends of bands 71 pass around the periphery of gear housing 39 and are mounted on rod member 87. Band 71 may be tightened or braking applied, by raising arm member 81 thereby causing housing 39 to be held stationary with respect to frame 53. Of course, many other types of well-known braking mechanisms may be used satisfactorily.

In operation, the transmission may be placed in neutral, reduced ratio drive, or direct drive modes by selective actuation of the clutch assembly and brake means. To place the transmission in the neutral mode, the clutch control arm 61 is moved in such manner as to force release bearing 65 and clutch finger 27 forward and clutch pressure plate 19 rearward against the pressure of springs 21, thus causing clutch drive disc 17 to be disengaged from rotating with flywheel 9. The brake bands 71 are released allowing gear housing 39 to freely rotate. Torque from flywheel 9 is transferred through clutch cover 13 and tubular shaft 30 to sun gear 31. The rotation of sun gear 31 is transferred to the planetary gears 33. The rotation of planetary gears 33 is consequently transferred to ring gear 37 causing the gear housing to rotate. The planetary gears remain relatively stationary with respect to the rotating gear housing 39 and thus transmitting no torque along carrier 45 to the output shaft 29.

To achieve a reduced gear ratio, the brake bands 71 are tightened around gear housing 39 causing gear housing 39 to be secured in a stationary position with respect to the frame 53. With the clutch 17 still disengaged, rotation of the flywheel is transferred to the clutch cover 13 and tubular shaft 15, and thence to the sun gear 31. As sun gear 31 rotates, it causes planetary gears 33 to move around the sun gear since the ring gear 37 is held in a stationary position by the clamped gear housing 39. Rotation of planetary gear 33 causes carrier 45 to rotate, thus transferring torque to the output shaft 29.

To provide for direct drive, brake means 51 is released and the clutch control is caused to move toward the front of the transmission engaging the clutch drive disc 17 with the flywheel 9. The torque of the flywheel 9 is thusly transferred directly to the output shaft 29. With the brake 51 released, the gear housing 39 will rotate freely about its bearing 41. Since the sun gear 31, planetary gear 33, and ring gear 37 are not rotating with respect to one another in the direct drive mode, no friction is generated by the gear train. The only friction encountered is that generated by the bearings and air friction against the rotating clutch and gear housings. Thus, maximum power and torque is transmitted from the drive shaft 3 to the output shaft 29 in the direct drive mode.

The transmission can be operated either manually or by using a system of automatic controls. For automatic control, an electric solenoid not shown may be pivotally connected to the outer end of clutch lever 61. A vacuum controlled clamp would then be coupled to the outer end of lever 61. It will be appreciated that other means, for example vacuum controlled means, may be utilized to operate the brake system of the invention. Where, for instance, the inventive transmission is to be used in an automobile, when the ignition circuit of the auto is activated, electric current would cause the solenoid means to move clutch control lever 61 in such manner as to disengage clutch plate 17. The brake bands 71 would be in their unengaged position since no vacuum from the engine will be available to actuate the clamping mechanism. Thus, the transmission is in the neutral mode and the engine may be started.

In operation, the vacuum control will deactivate the solenoid means, but remain holding the clutch in the released position. When the driver places the transmission in gear, the vacuum control would couple to the end of brake band actuating arm 81 causing the arm to move about its pivot in such manner as to cause arm 83 to compress spring members 85 and tighten brake bands 71 around gear housing 39 whereby the transmission is placed in reduced ratio or "low" gear. At a predetermined RPM, the vacuum control would be deactivated causing the brake to be released; such control would be deactivated allowing the clutch 17 to engage the flywheel 9 to place the transmission in direct drive or "high" gear. It will be appreciated that additional gear units and associated automatic controls may be mounted coaxially with the gear housing 39 to provide for multiple ratio or reverse gearing arrangements. It will also be appreciated that the inventive device and system may be readily adapted for use in electrical hand tools such as reversible electric drills and screw drivers. It will also be recognized by those skilled in the art that the inventive device may be operated electrically or hydraulically for automobile use and easily installed on existing automobiles with automatic transmissions to produce a substantially friction free automatic transmission which, it is estimated, would materially increase the gasoline mileage of the auto. Thus, the present invention provides a mechanically simple and reliable variable ratio coaxially aligned transmission having a reduced friction direct drive.

While the invention has been described in considerable detail, it is understood that various changes and modifications may occur to persons of ordinary skill in the art without departing from the spirit and scope of the invention as is defined in the appended claims.

What is claimed is:

1. A mechanical transmission comprising:
    an input shaft connected to a source of power;
    a clutch cover means connected to said input shaft;
    a tubular shaft connected to said clutch cover means and extending rearwardly therefrom;
    an output shaft disposed coaxial with and extending through said tubular shaft;
    a clutch assembly disposed within said clutch cover means and connnected to one end of said output shaft, said clutch assembly being selectively engageable with said clutch cover means for rotation therewith;
    a gear housing rotationally mounted around said tubular shaft and said output shaft;
    a gear assembly disposed within said gear housing comprising: a sun gear attached to said tubular shaft; a plurality of planetary gears engaging said sun gear; a carrier means for supporting and drivingly connecting said planetary gears to said output shaft; and a ring gear mounted on the inside of said gear housing engaging said planetary gears;
    a frame means for supporting said output shaft and said gear housing;
    brake means, mounted on said frame means adjacent said gear housing, selectively engageable with said gear housing; and
    means for selectively actuating and engaging said clutch assembly and said brake means.

2. The invention of claim 1, wherein said clutch cover means includes a flywheel engageable with said clutch assembly.

3. The invention of claim 1 wherein said clutch assembly comprises: a clutch plate connected to said output shaft; a clutch pressure plate disposed adjacent said clutch plate, said pressure plate being normally biased against said clutch plate by spring means so as to cause said clutch plate to engage said clutch cover means; pressure plate actuation means engaging portions of said pressure plate and extending through said clutch cover means; throw-out bearing means, slidingly journaled about said tubular shaft and engaging said pressure plate actuation means; and a clutch actuation lever pivotally mounted on said frame means, one end of said lever engaging said throw-out bearing means and the other end of said lever connected to said clutch actuating and engaging means.

4. The invention of claim 1 wherein said brake means comprises a band brake circumferentially disposed around the periphery of said gear housing, one portion of said hand brake being fixedly attached to said frame means and another portion of said hand brake being attached to one end of a brake actuation lever pivotally mounted to said frame means, the other end of said brake actuation lever connected to said brake actuating and engaging means.

5. The invention of claim 3 wherein said clutch actuating and engaging means comprises a solenoid latching relay and a vacuum operated clamping means to selectively engage and disengage said clutch plate.

6. The invention of claim 4 wherein said brake actuating and engaging means comprises a vacuum operated clamping means to selectively engage and disengage said brake band.

7. A mechanical transmission for use with an engine comprising:
    an input shaft connected to said engine;
    a clutch cover means connected to said input shaft, said clutch cover means including a flywheel;
    a tubular shaft connected to said clutch cover means and extending rearwardly therefrom;
    an output shaft disposed coaxial with and extending through said tubular shaft;
    a clutch assembly disposed within said clutch cover means and connected to one end of said output shaft, said clutch assembly being selectively engageable with said flywheel for rotation therewith;
    a gear housing rotationally mounted around said tubular shaft and said output shaft;
    a gear assembly disposed within said gear housing comprising: a sun gear attached to said tubular shaft; a plurality of planetary gears engaging said sun gear; a carrier drivingly connected to said output shaft for supporting said planetary gears; and a ring mounted on the inside of said gear housing engaging said planetary gears;
    a frame means for supporting said output shaft and gear housing;
    a band brake assembly, mounted on said frame means adjacent said gear housing selectively engageable with said gear housing; and
    electrically and vacuum operated actuating means for selectively engaging and disengaging said clutch assembly and said band brake assembly.

8. The invention of claim 7 wherein said ring gear is formed integral with the interior of said gear housing.

9. The invention of claim 7 wherein said frame means comprises a U-shaped frame member attached to said engine and having a central opening to receive and support said output shaft.

10. The invention of claim 9 wherein said frame member completely encloses said clutch cover means and said gear housing to seal them from the environment.

11. The invention of claim 7 wherein said band brake assembly comprises a band brake circumferentially disposed around the periphery of said gear housing, one portion of said band brake being fixedly attached to said frame means and another portion of said band brake being attached to one end of a brake actuation lever pivotally mounted to said frame means, the other end of said brake actuation lever connected to said brake actuating and engaging means.

* * * * *